(12) United States Patent
Sundheimer et al.

(10) Patent No.: US 9,497,443 B1
(45) Date of Patent: Nov. 15, 2016

(54) 3-D ENVIRONMENT MAPPING SYSTEMS AND METHODS OF DYNAMICALLY MAPPING A 3-D ENVIRONMENT

(71) Applicant: THE UNITED STATES OF AMERICA AS REPRESENTED BY THE SECRETARY OF THE NAVY, Washington, DC (US)

(72) Inventors: Brent James Sundheimer, Ridgecrest, CA (US); Brandon Catalano, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 192 days.

(21) Appl. No.: 14/294,998

(22) Filed: Jun. 3, 2014

Related U.S. Application Data

(63) Continuation-in-part of application No. 13/221,205, filed on Aug. 30, 2011, now abandoned.

(51) Int. Cl.
*G06F 3/033* (2013.01)
*G06T 13/00* (2011.01)
*H04N 13/02* (2006.01)

(52) U.S. Cl.
CPC ...... *H04N 13/0271* (2013.01); *H04N 13/0282* (2013.01)

(58) Field of Classification Search
CPC ............ G06F 17/30817; G06T 3/0062; G06T 15/205; G06T 19/003; G06T 2207/30244; G06T 7/0018; G06T 7/0042; H04N 7/183
See application file for complete search history.

(56) References Cited

U.S. PATENT DOCUMENTS

| | | | |
|---|---|---|---|
| 3,568,954 A * | 3/1971 | McCorkle, Jr. | F42B 10/661 244/3.2 |
| 5,064,006 A * | 11/1991 | Waters | E21B 7/068 175/45 |
| 2004/0227820 A1 * | 11/2004 | Nister | G06K 9/209 348/207.99 |
| 2006/0250389 A1 | 11/2006 | Gorelenkov | |
| 2007/0014003 A1 | 1/2007 | Zadravec | |
| 2009/0009469 A1 * | 1/2009 | Hsu | G06F 3/0317 345/158 |
| 2010/0045701 A1 | 2/2010 | Scott et al. | |
| 2010/0061701 A1 | 3/2010 | Iwane | |
| 2010/0201808 A1 * | 8/2010 | Hsu | G06T 7/0042 348/135 |
| 2011/0169951 A1 * | 7/2011 | Claxton | G06K 9/6293 348/143 |

OTHER PUBLICATIONS

Robert Grover Brown and Patrick Y.C. Hwang, "Introduction to Random Signals and Applied Kalman Filtering, with Matlab Exercises and Solutions," 1997, John Wiley & Sons, Inc., 3rd Edition, section 5.5, p. 214-220.*

* cited by examiner

*Primary Examiner* — Sing-Wai Wu
(74) *Attorney, Agent, or Firm* — James M. Saunders

(57) ABSTRACT

A 3-D environment mapping systems and methods of dynamically mapping a 3-D environment includes identifying at least five point correspondences associated with image frames of a scene recorded by a camera from a plurality of viewpoints. A down direction is determined from IMU motion data. The down direction is an absolute global downward direction. Components of the scene that are vertical are identified using the down direction, an iteration of 3-D position of each of the five point correspondences, and a current iteration of refined relative locations and poses of the camera. A 2-D map is generated of the scene by mapping the identified components of the scene in an eagle view of the scene.

7 Claims, 3 Drawing Sheets

US 9,497,443 B1

3-D ENVIRONMENT MAPPING SYSTEMS AND METHODS OF DYNAMICALLY MAPPING A 3-D ENVIRONMENT

CROSS-REFERENCE TO RELATED APPLICATIONS

This is a continuation-in-part application, claiming the benefit of parent provisional application Ser. No. 13/221,205 filed on Aug. 30, 2011, whereby the entire disclosure of which is incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to 3-D mapping systems and methods.

DETAILED DESCRIPTION

Figure 1:
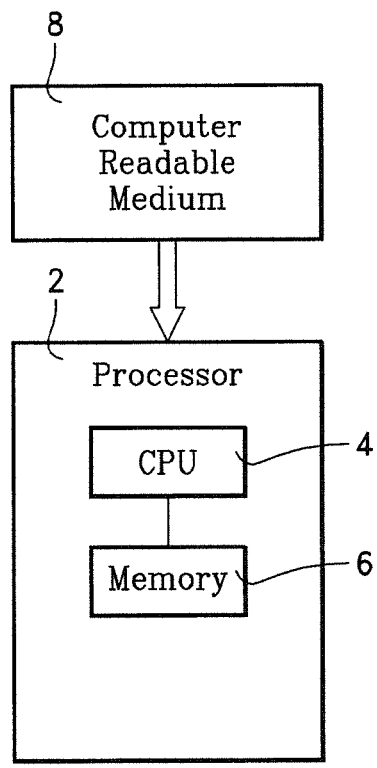
FIG. 1 is a block illustration of a computer readable medium and an embodiment of a processor, according to some embodiments of the invention.

The term computer-readable medium (devices, carriers, or media), as used in this specification including the claims, includes any non-transitory medium, such as, for example, a magnetic storage media, "floppy disk", CD-ROM, RAM, a PROM, an EPROM, a FLASH-EPROM, any other memory chip or cartridge, a file server providing access to the programs via a network transmission line, holographic unit, a memory circuit within an integrated circuit, etc. With reference to FIG. 1, the machine that executes the processor 2 (CPU 4 and memory 6) executable instructions (software, computer program, etc.) stored on the computer-readable medium 8 can be any electronic device capable of executing the instructions of a computer program stored on the computer-readable media 8. Of course, those skilled in the art will recognize that many modifications may be made to this configuration without departing from the scope of the invention. Additionally, embodiments of the invention are applicable to image analysis for both systems and methods.

Down Direction

The term "down direction" is an absolute down. As such, "down direction" is used herein as an absolute global downward direction. Thus, "down direction" is down with respect to the earth and is not to be construed as a relative down. Stated another way, "down direction" is analogous to the direction of gravity.

A Priori Information not Used

A priori information is not used in embodiments of the invention. Thus, systems and methods associated with embodiments of the invention do not incorporate a priori information. Stated another way, known points (information) are not used to assist in calculations or to provide global reference points in which to calculate absolute world coordinates. Additionally, GPS components are optional and, thus, may be excluded from embodiments of the invention, unless specifically claimed.

System Embodiments

Figure 2:
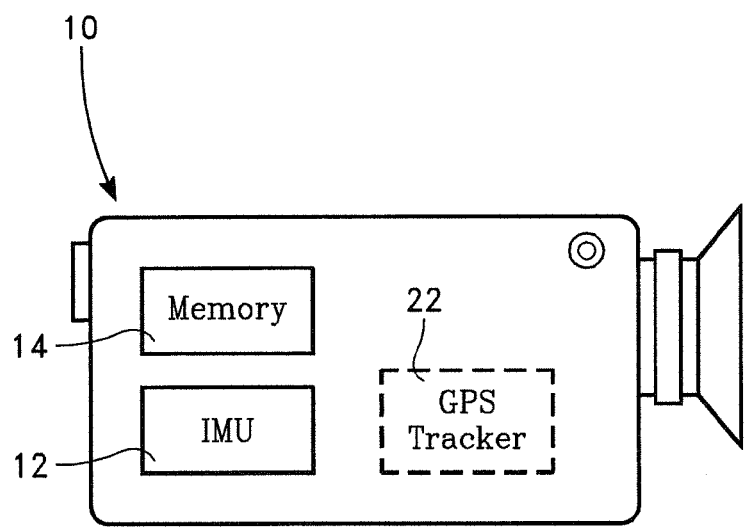
FIG. 2 is a side perspective view of a camera having an IMU and Memory (and, as indicated using the dashed line, optionally a GPS tracker), according to some embodiments of the invention.

With reference to FIG. 2, system embodiments include a camera 10 to generate a video stream including a plurality of image frames of a scene taken from a plurality of viewpoints. The term 'scene', as used herein, including the claims, refers to an area of interest. An embodiment's 'camera' can be any camera capable of capturing/recording two dimensional (2-D) data in either the visual or other electromagnetic spectra. Each of the plurality of image frames shares at least five point correspondences with at least one of the other of the plurality of image frames.

System embodiments further include an inertial measurement unit 12 locally associated with the camera 10 to provide at least six axes of image motion data of the camera 10 during recording of multiple of the plurality of image frames. The phrase 'image motion' is used herein, including the claims, to describe the time-change of the image due to a relative motion between the scene and the camera 10.

With reference to FIGS. 1 and 2, system embodiments include a non-transitory computer readable medium 8 having stored thereon a plurality of processor 2 executable instructions. The executable instructions, when executed by the processor 2, cause the processor 2 to:

identify at least five point correspondences among at least two of the plurality of the plurality of image frames;

generate a first unfused relative locations and poses of the camera 10 data by analyzing the at least five point correspondences according to a motion estimation algorithm;

generate a second unfused relative locations and poses of the camera 10 data using the image motion data;

determine a 3-D position of each of the at least five point correspondences;

generate a refined relative locations and poses of the camera 10 data by applying a data fusion algorithm to the first unfused relative locations and poses of the camera 10 and the second unfused relative locations and poses of the camera 10;

determine a down direction from the IMU 12 motion data (by analyzing movement of the camera 10 over time and using a direction orthogonal to the path OR extracting it more directly from the IMU 12 image motion data according to any known mathematical model); and generate a 2-D map of the scene by using the determined down direction, the 3-D position of each of the at least five point correspondences, and the refined relative locations and poses of the camera 10 data, to identify components of the scene that are sufficiently vertical.

Figure 3B:
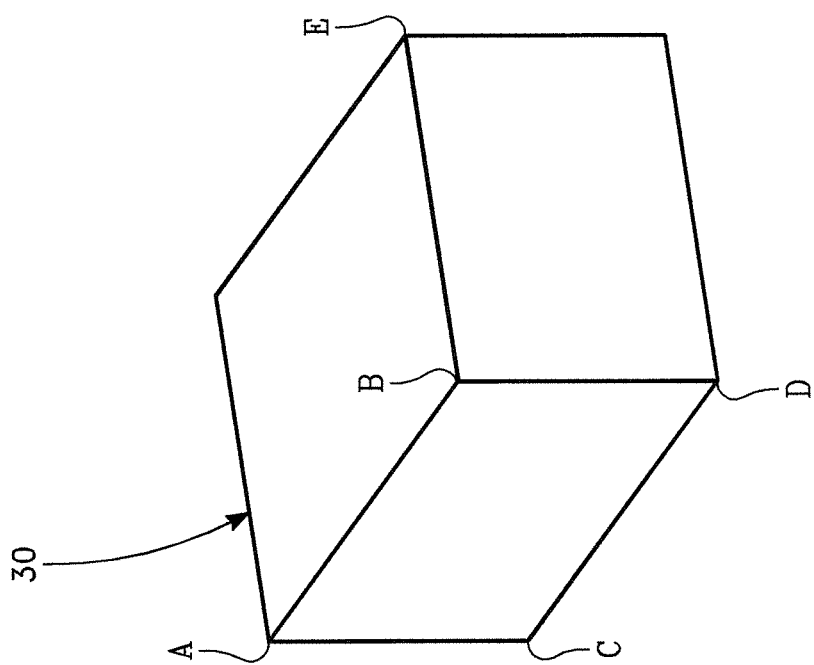
FIGS. 3A and 3B illustrate and example of five point correspondences of a scene by illustrating two images showing a scene including a wooden crate that is taken from two different camera viewpoints and having corresponding corners, according to some embodiments of the invention.
Figure 3A:
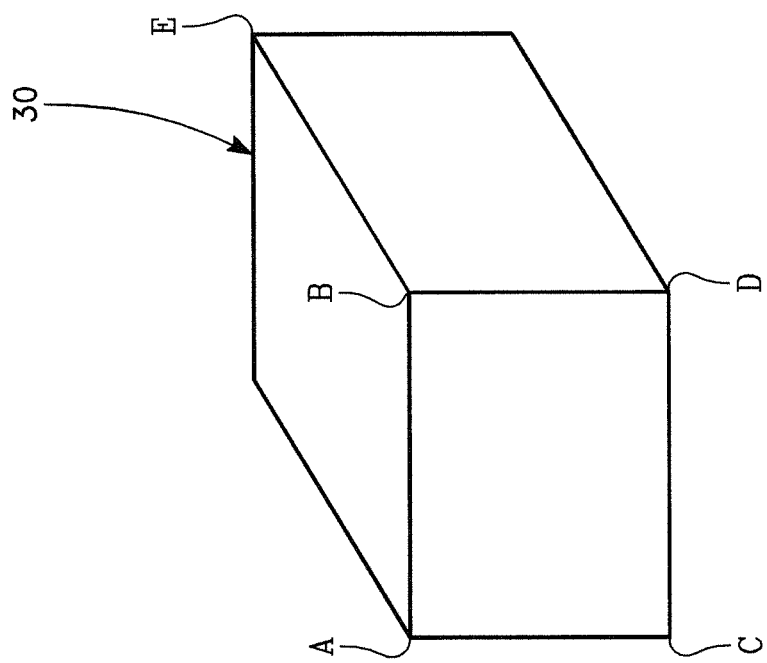

The instructions that cause the processor 2 to identify at least five point correspondences (pairs of image points within a scene are identified between two images of the same scene) among at least two of the plurality of the plurality of image frames can be instructions according to any known automatic feature matcher. Though any known automatic feature matcher may be used. FIGS. 3A and 3B illustrate an example of a set of 5 point correspondences of a scene. If two images showing a scene including a wooden crate 30 that is taken from two different camera viewpoints, then corresponding corners A-E of the wooden crates 30 are considered a set of 5 point correspondences of a scene. Of course, this scene contains many point correspondences that are not specifically labeled.

The phrase "unfused relative locations and poses of the camera" as used herein, including the claims, describes the location and pose of the camera at different view points. The instructions that cause the processor to determine an unfused relative locations and poses of the camera can be instructions according to any motion estimation algorithm.

The instructions that cause the processor to "determine a 3-D position of each of the at least five point correspondences" are instructions that cause the processor to solve for the relative pose problem, using any known algorithm of implementing a five (or more) point method.

In some embodiments, the instructions that cause the processor to generate a refined relative locations and poses of the camera data by applying a data fusion algorithm to the 'first unfused relative locations and poses of the camera data' and the 'second unfused relative locations and poses of the camera data' describes instructions that cause the processor to generate refined (relative to the unfused location and pose) relative locations and poses of the camera by fusing the data that was calculated using multiple input sources (such as the IMU 12 and the image frames recorded on the camera's 10 memory 14) and mathematical models; the fusing instructions can be any instructions that, when executed, cause the electronic processor to generate a refined locations and poses of the camera data, such as, for example, instructions according to a Kalman filter.

Figure 4:
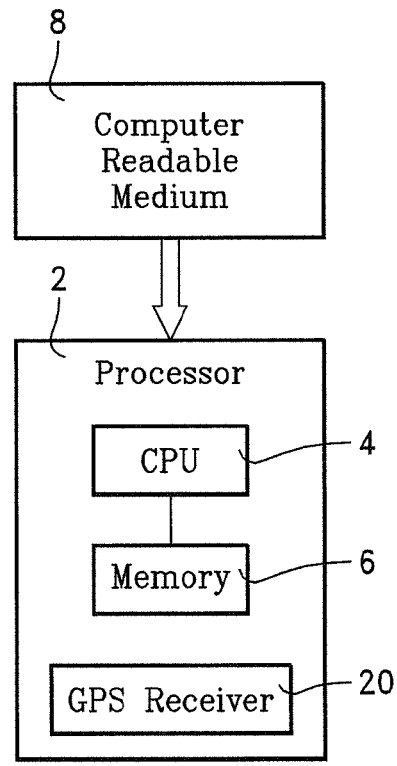
FIG. 4 is a block illustration of a computer readable medium and a processor with the processor communicatively-associated with a GPS receiver, according to some embodiments of the invention.

With reference to FIGS. 2 and 4, some embodiments include hardware and instructions that perform a dead reckoning. These embodiments include a GPS tracker 22 (or any other assisted like system) locally associated with the camera 10. These embodiments further include a GPS receiver 20 associated with the processor 2. In these embodiments, the plurality of processor executable instructions further includes instructions that, when executed by the processor 2, cause the processor 2 to translate the relative position of the version(s) of the 2-D map into absolute position.

Multiple Iterations

Some system embodiments are configured to perform multiple iterations. With reference to FIG. 2, these embodiments include a camera 10 to generate a video stream including a plurality of image frames including a scene taken from a plurality of viewpoints. Each of the plurality of image frames shares at least five point correspondences with at least one of the other of the plurality of image frames.

These embodiments also include an inertial measurement unit 12 associated with the camera 10 to provide six axes of image motion data during recording of a plurality of the plurality of image frames.

With reference to FIGS. 2 and 4, these embodiments also include a computer readable medium 8 having stored thereon a plurality of processor 2 executable instructions that, when executed by the processor 2, cause the processor 2 to perform at least one iteration of the following (bullets). Each of the iterations employ at least one of a combination of point correspondences that has not been analyzed in any preceding iterations AND a combination of the plurality of viewpoints that has not been used in any preceding of the iterations:

- identify at least five point correspondences associated with a current iteration present within at least two of the plurality of the plurality of image frames;
- generate a current iteration first unfused relative locations and poses of the camera data by analyzing the at least five point correspondences according to a motion estimation algorithm;
- generate a current iteration second unfused relative locations and poses of the camera data using the image motion data;
- determine a current iteration 3-D position of each of the at least five point correspondences associated with the current iteration (of the at least one iteration(s));
- generate a current iteration refined relative locations and poses of the camera data by applying a data fusion algorithm to the current iteration first unfused relative locations and poses of the camera 10 and the current iteration second unfused relative locations and poses of the camera 10;
- determine a current iteration down direction from the IMU 12 motion data (by analyzing movement of the camera 10 over time and using a direction orthogonal to the path OR extracting it more directly from the IMU 12 image motion data according to any known mathematical model); and
- generate a current iteration's version of a 2-D map of the scene by using the down direction, the current iteration's version of the refined relative locations and poses of the camera 10 data, and the current iteration 3-D position of each of the at least five point correspondences to identify components of the scene that are sufficiently vertical; the 2-D map of the scene is an eagle eye view of the scene. This view of the scene only contains sufficiently vertical surfaces, because horizontal surfaces such as ceilings and floors can obfuscate the 2-D map for indoor scenarios.

The phrases "current iteration first unfused relative locations and poses of the camera" and "current iteration second unfused relative locations and poses of the camera" as used herein describes the locations and poses data of the camera 10 at different view points generated during the current iteration of the at least once iteration(s).

The phrase "generate a current iteration refined relative locations and poses of the camera data by applying a data fusion algorithm to the current iteration first unfused relative locations and poses of the camera data and the current iteration second unfused relative locations and poses of the camera data" as used herein describes the refined relative locations and poses of the camera 10 data generated during the current iteration of the at least one iteration(s).

The phrase "generate a current iteration's version of a 2-D map of the scene by using the down direction, the current iteration's version of the refined relative locations and poses of the camera data, and the current iteration 3-D position of each of the at least five point correspondences to identify components of the scene that are sufficiently vertical" as used herein describes the version of the 2-D map of the scene generated during the current iteration of the at least one iteration(s).

In some of the multi-iteration embodiments, the processor 2 executable instructions further include instructions that, when executed by the processor 2, cause the processor 2 to generate a current iteration's version of a composite 2-D map using at least one previous iteration's version(s) of the 2-D map when the current iteration is not an initial iteration, with each of the current iteration's version of the composite 2-D map being a composite of at least one preceding iteration's version of the 2-D map and the current iteration's version of the 2-D map.

In other of the multi-iteration embodiments, the processor 2 executable instructions further include instructions that, when executed by the processor 2, cause the processor 2 to generate a current iteration's version of a composite 2-D map using a plurality of previous iteration's versions of the 2-D map when the current iteration is not an initial iteration and not a second iteration, wherein each of the current iteration's version of the composite 2-D map is a composite of a plurality of preceding iteration's version of the 2-D map and the current iteration's version of the 2-D map.

In yet other of the multi-iteration embodiments, the processor 2 executable instructions further include instructions that, when executed by the processor 2, cause the processor 2 to generate a current iteration's version of a composite 2-D map using the previous iteration's version of the 2-D map when the current iteration is not an initial iteration, wherein each of the current iteration's version of the composite 2-D map is a composite of its previous iteration's version of the 2-D map and the current iteration's version of the 2-D map.

Method Embodiments

Figure 5:
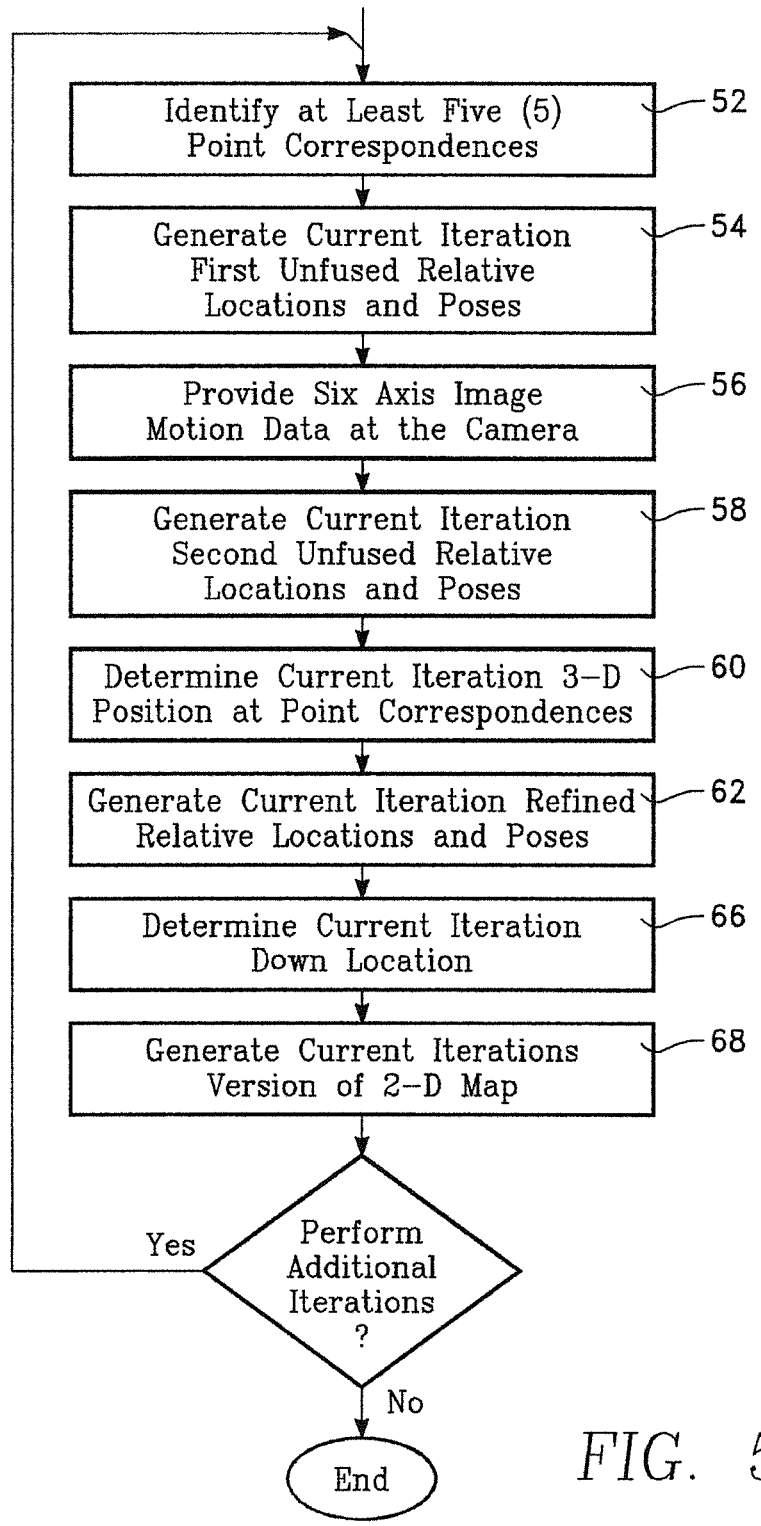
FIG. 5 illustrates a flow chart of steps performed, according to some embodiments of the invention.

With reference to FIG. 5, method embodiments include iterating through the following acts at least once, with each of the at least one iterations employing at least one of a combination of point correspondences than has not been analyzed in any preceding of the at least one iterations AND a combination of the plurality of viewpoints that has not been used in any preceding of the at least one iterations:

identifying at least five point correspondences associated with a current iteration and present within a current iteration's plurality of (of a plurality of) image frames of a scene recorded by a camera from a plurality of viewpoints 52;

generating a current iteration first unfused relative locations and poses of the camera data by analyzing the at least five point correspondences (associated with the current iteration) according to a motion estimation algorithm 54;

providing six axes of image motion data of the camera generated to provide data that describes (can be analyzed to determine) image motion of the camera during recording of multiple of the plurality of image frames 56;

generating a current iteration second unfused relative locations and poses of the camera data using the image motion data (using image motion data corresponding to image motion of the camera at the view points of the current iteration's plurality of plurality of image frames) 58;

determining a current iteration 3-D position of each of the at least five point correspondences associated with the current iteration (of the at least one iteration(s)) 62;

generating a current iteration refined relative locations and poses of the camera data by applying a data fusion algorithm to the current iteration first unfused relative locations and poses of the camera and the current iteration second unfused relative locations and poses of the camera 64;

determining a current iteration down direction from the IMU motion data (by analyzing movement of the camera over time and using a direction orthogonal to the path or extracting it more directly from the IMU image motion data according to any known mathematical model) 66; and generating a current iteration's version of a 2-D map of the scene by using the down direction, the current iteration's version of the refined relative locations and poses of the camera data, and the current iteration 3-D position of each of the at least five point correspondences to identify components of the scene that are sufficiently vertical; the 2-D map of the scene is an eagle eye view rendering of the scene 68.

In some method embodiments, the generating a current iteration's version act 68 includes using at least one previous iteration's version(s) of the 2-D map when the current iteration is not an initial iteration, wherein each of the current iteration's version of the composite 2-D map is a composite of at least one preceding iteration's version of the 2-D map and the current iteration's version of the 2-D map.

In other method embodiments, the generating a current iterations version act 68 includes using a plurality of previous iteration's version(s) of the 2-D map when the current iteration is not an initial iteration, wherein each of the current iteration's version of the composite 2-D map is a composite of at least one preceding iteration's version of the 2-D map and the current iteration's version of the 2-D map.

In yet other method embodiments, the generating a current iteration's version act 68 includes using the previous iteration's version of the 2-D map when the current iteration is not an initial iteration, wherein each of the current iteration's version of the composite 2-D map is a composite of at least one preceding iteration's version of the 2-D map and the current iteration's version of the 2-D map.

Additionally, some embodiments map identified components of the scene in an eagle view of the scene. This is performed to separate areas in densely filled environments or environments having ceilings.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A 3-D environment mapping system to separate areas in an indoor scenario, said system does not include a global positioning system (GPS) tracker and does not use a priori information, said system, comprising:

a camera to generate a video stream comprised of a plurality of image frames including a scene taken from a plurality of viewpoints, each of said plurality of image frames sharing at least five point correspondences with at least one of the other of said plurality of image frames;

an inertial measurement unit (IMU) associated with said camera to provide at least six axes of image motion data during recording of a plurality of said plurality of image frames; and a non-transitory computer readable medium having stored thereon a plurality of processor executable instructions that, when executed by said processor, cause said processor to perform at least one iteration of the following, with each of said at least one iteration employing at least one of a combination of point correspondences that has not been analyzed in any preceding of said at least one iteration and a combination of said plurality of viewpoints that has not been used in any preceding of said at least one iteration, identify at least five point correspondences associated with a current iteration present within at least two of said plurality of said plurality of image frames, determine a current iteration unfused relative locations and poses of said camera by analyzing said at least five point correspondences associated with said current iteration, determine a current iteration three-dimensional (3-D) position of each of said at least five point correspondences associated with said current iteration, produce a current iteration's version of a refined relative locations and poses of said camera by applying a data fusion algorithm to said current iteration unfused relative poses and locations and said motion data, determine a down direction from said IMU motion data, wherein said down direction is an absolute global downward direction with respect to the Earth, identify components of said scene that are vertical using said down direction, said current iteration, and said current iteration's version of said refined relative locations and poses of said camera, and generate a current iteration's version of a two-dimensional (2-D) map of said scene for an indoor scenario, by mapping said identified components of said scene that are vertical into an eagle eye view of said scene, said eagle eye view of said scene showing said identified components that are vertical for said indoor scenario, wherein said identified components that are vertical are vertical surfaces for said indoor scenario, said eagle eye view of said scene showing separate areas of said indoor scenario defined by said vertical surfaces.

2. The system according to claim 1, wherein said processor executable instructions further comprising instructions that, when executed by said processor, cause said processor to generate a current iteration's version of a composite 2-D map using at least one previous iteration's version(s) of said 2-D map when said current iteration is not an initial iteration, each of said current iteration's version of said composite 2-D map being a composite of at least one preceding iteration's version of said 2-D map and said current iteration's version of said 2-D map.

3. The system according to claim 1, wherein said processor executable instructions further comprising instructions that, when executed by said processor, cause said processor to generate a current iteration's version of a composite 2-D map using a plurality of previous iteration's versions of said 2-D map when said current iteration is not an initial iteration and not a second iteration, each of said current iteration's version of said composite 2-D map being a composite of a plurality of preceding iteration's version of said 2-D map and said current iteration's version of said 2-D map.

4. The system according to claim 1, wherein said processor executable instructions further comprising instructions that, when executed by said processor, cause said processor to generate a current iteration's version of a composite 2-D map using the previous iteration's version of said 2-D map when said current iteration is not an initial iteration, each of said current iteration's version of said composite 2-D map being a composite of its previous iteration's version of said 2-D map and said current iteration's version of said 2-D map.

5. The system according to claim 1, wherein said down direction is determined by identifying an orthogonal direction to a path of said camera and assigning said orthogonal direction as said down direction.

6. The system according to claim 1, wherein said absolute global downward direction with respect to the Earth is the direction of gravity.

7. The system according to claim 1, wherein said vertical surfaces are walls.

* * * * *